Sept. 15, 1942.    J. J. WYDLER    2,295,619
INTERNAL COMBUSTION ENGINE
Original Filed Nov. 12, 1938
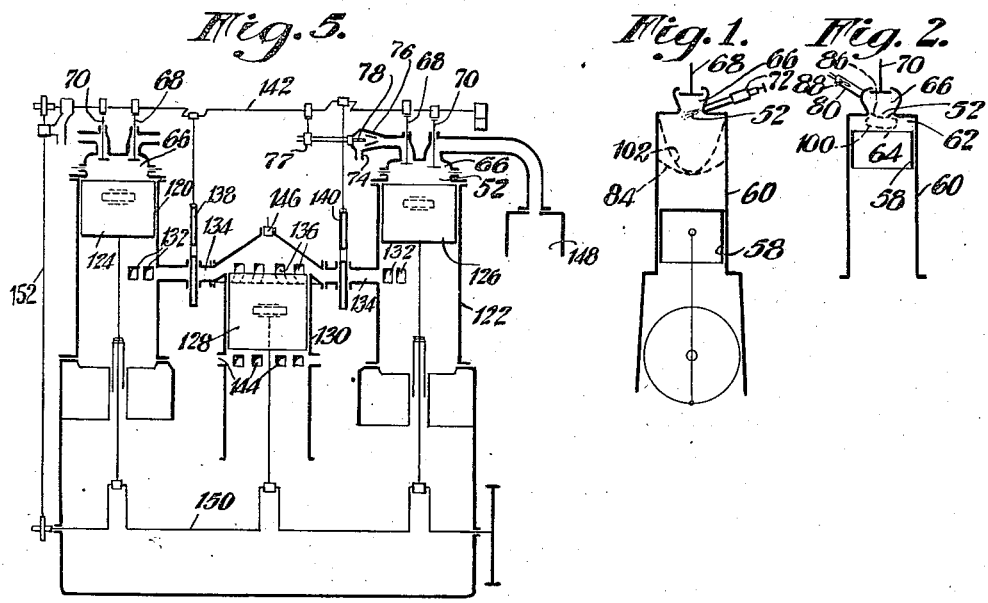
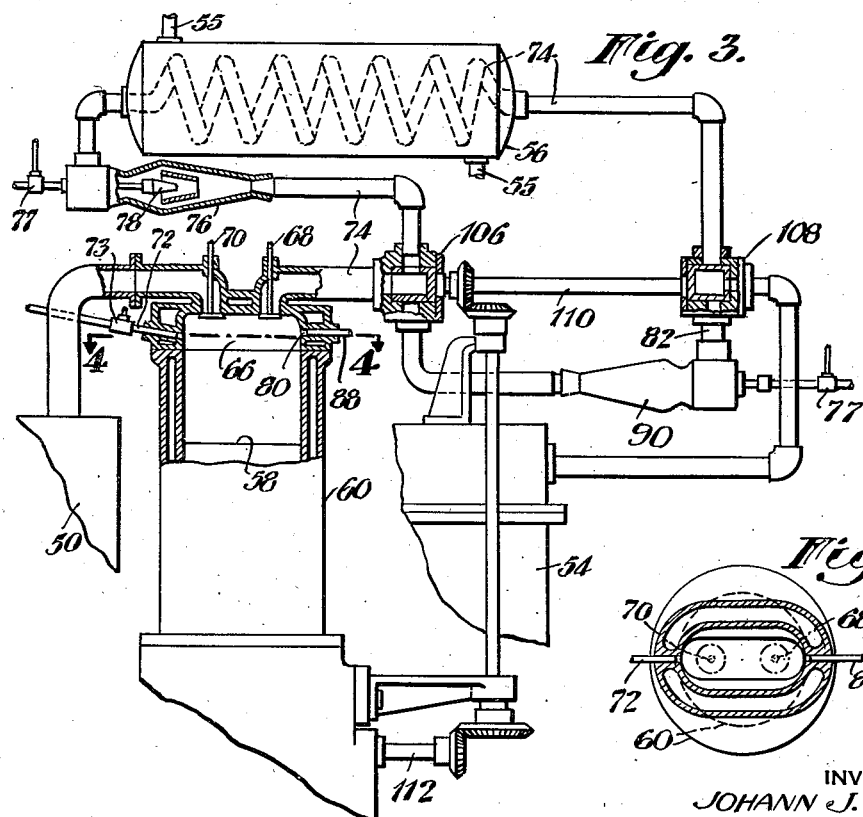
INVENTOR
JOHANN J. WYDLER
BY
ATTORNEY Patented Sept. 15, 1942

2,295,619

UNITED STATES PATENT OFFICE 2,295,619

INTERNAL COMBUSTION ENGINE

Johann J. Wydler, Westfield, N. J., assignor, by mesne assignments, to Cities Service Oil Company, New York, N. Y., a corporation of Pennsylvania Original application November 12, 1938, Serial No. 240,013. Divided and this application February 15, 1940, Serial No. 318,986

8 Claims. (Cl. 123—1)

This invention relates to internal combustion engines, and more particularly to an improved internal combustion engine adapted for efficiently and economically converting heat of combustion into mechanical work. This invention was originally described in my copending application Serial No. 240,013, filed November 12, 1938, for Internal combustion method and apparatus, of which this is a division.

Many suggestions have been heretofore made designed to increase the heat conversion efficiency of the internal combustion engine. For example it has been heretofore suggested that the heat losses sustained through radiation from the combustion zone might be reduced by lining said zone with refractory or heat insulating material. Likewise it has been heretofore proposed to reduce the energy loss normally sustained through discharge of hot engine exhaust gases by employment of a compound engine equipped with a second low pressure expansion cylinder operable to convert some of the energy still carried by the exhaust gases from the high pressure working cylinder into mechanical energy.

A primary object of the present invention is to provide an improved internal combustion engine which is adapted for efficient conversion of heat of combustion into mechanical work even when practiced within the confines of a single power cylinder.

Experience has shown that an important contributory cause of the low power conversion secured in the operation of many present day internal combustion engines is the inefficient utilization of air and fuel supplied for combustion. For example many present day Diesel engines operate on an air-fuel ratio in which the air exceeds by a considerable amount that theoretically required for complete combustion of the fuel, and the excess air not utilized for combustion carries away with it from the working space a considerable amount of heat as waste energy. A reason for the need of this large amount of excess air in order to completely burn the fuel supply has been the inefficient mixing of the fuel and air within the combustion zone prior to and during the working stroke.

Another object of the present invention is to provide an improved internal combustion engine design adapted to reduce power loss due to heat radiation and inefficient air utilization.

To accomplish the above object one important feature of the invention contemplates making deliberate use of and promoting the tendency of gases successively introduced into an engine cylinder to keep stratified in the cylinder during successive piston strokes, which is a primary cause of inefficient air utilization by present operating engines, as the basic feature of an improved six-stroke cycle internal combustion operation adapted for practice with substantially theoretical volumes of air and fuel for complete combustion, and with reduced radiation losses.

The improved engine cycle which forms the subject of the present invention may be carried out in one or two working cylinders, and may employ precompression or air supercharging primarily as a means of reducing piston displacement of the power unit. All of the air used during the working cycle enters the main power cylinder during one air intake stroke. However, this air is burned in two portions during two power strokes of a six-stroke cycle. A major part but not all of the fuel for one complete cycle, is supplied and burned during the first power stroke. That portion of the air which is to be burned during the second power stroke is first introduced to the engine cylinder as substantially pure cold air during the first part of the air intake stroke, and during the latter part of the air intake stroke the air utilized in the first power stroke is introduced in preformed admixture with the fuel for the first power stroke. The air first introduced forms a stratified layer adjacent the piston head, and stratification is maintained between this air layer and the layer of combustible mixture as the piston reciprocates through the intake and first compression stroke. During the first power stroke this layer of air adjacent the piston forms an envelope or cushion between the burning portion of the charge and the piston and cylinder walls.

With a properly proportioned mixture of air and fuel undergoing combustion during the first power stroke, a substantial part of the heat which would otherwise be lost by radiation and conduction through the walls and piston head is absorbed by the air envelope, and is thereby returned as excess power during the first power stroke by reason of the expansion of the volume of the air envelope in proportion to its temperature rise. Thus a considerable part of the heat saving effected during the first combustion or power stroke can be converted into mechanical work without the use of unnecessarily high operating temperatures and pressures, with resulting high heat losses in the exhaust gases such as occur when only a refractory lining of the engine cylinder is used to reduce heat losses. During the second power stroke the thus-preheated unburned portion of the first air charge is used up in burning a second charge of fuel which may be introduced by solid injection at the end of the second compression stroke.

Special design features of the engine for carrying out the operating cycle above outlined will be explained in the following specific description. An important design feature resides in the employment of an ignition and valve chamber at the head of the primary working cylinder having a throat of substantial area communicably connecting the chamber with the cylinder bore, whereby to introduce gas into and remove gases from the cylinder while promoting conditions of gas stratification and non-turbulence within the cylinder bore.

With the above and other objects and features in view, the invention will be hereinafter particularly described with reference to the accompanying drawing, in which:

Fig. 1 is a diagrammatic vertical section of an engine showing the piston at bottom dead center position, either just prior to completion of the first and intake stroke of the six-stroke cycle, or at the end of the first power stroke, or at the beginning of the second compression stroke;

Fig. 2 is a diagrammatic view showing the engine of Fig. 1 with the piston at top dead center position 64, either at the end of the second stroke and first compression stroke of the six-stroke cycle, or at the beginning of the first power stroke;

Fig. 3 is a view in elevation of a preferred design of one cylinder power plant adapted for the practice of the process of the invention, part of the working cylinder and valve chamber and part of the carbureter being shown in vertical section;

Fig. 4 is a plan section of the cylinder head of the engine of Fig. 3, taken on the line 4—4 of Fig. 3;

Fig. 5 is a diagrammatic vertical section of a preferred design of three-cylinder plant adapted for practicing the process cycle of the invention.

The invention contemplates a plant including a single power cylinder, or two cylinders which may be termed a primary and a secondary cylinder. While the drawing illustrates a power plant in which the cylinders are disposed on a vertical main axis, the cycle can be just as well practised in a power plant having horizontally disposed cylinders, or having cylinders disposed at any angle to the horizontal.

According to the present invention a complete process cycle develops two power strokes during a period of six piston strokes, and thus may be termed a six-stroke cycle process.

As illustrated in Figs. 1 to Fig. 5, inclusive, the principal elements of a power plant adapted for practicing the process include a working cylinder 60, a piston 58 mounted for reciprocation in the cylinder, and an ignition and valve chamber 66 positioned at the combustion end of the cylinder and communicably connected therewith by a throat 52 having an area which is at least one-fourth of the total cross-sectional area of the cylinder. An air and fuel intake valve 68 and an exhaust gas discharge valve 70 are mounted within the chamber 66. The total combustion clearance space within the engine when the piston is at top dead center position (see Fig. 2) is made up in part of a flat cylinder space 62 between the piston and the head of the cylinder, and in part of the valve chamber 66. In a power plant in which both power strokes of the six-stroke cycle are to be carried out in a single cylinder, a fuel injection nozzle 72 is positioned at the combustion end of the cylinder (Fig. 1), in position to inject atomized fuel under pressure past a valve 73 into chamber 66 and clearance space 62. According to the preferred plan of operation, as practiced in one cylinder, the fuel injection nozzle 72 is only operated at the beginning of the second power stroke.

Referring to Fig. 3, it will be seen that all of the air for both power strokes is preferably precompressed in compressor 54, the compressed air being conducted to the intake valve 68 through pipe 74. The precompressed air is preferably cooled down to substantially atmospheric temperature prior to its introduction to the working cylinder by passage through the coils of an intercooler or heat exchanger 56. Water or other cooling liquid is passed through the intercooler by pipe 55. According to the preferred cycle, the fuel which is used up during the first power stroke is preadmixed in correct proportion for perfect combustion with that portion of the air used up in the first power stroke, before the air and fuel mixture enters the working cylinder. This preadmixture or precarburetion of the air and fuel used in the first power stroke is effected by a carbureter 76 mounted in the air supply pipes 74, such carbureter having a fuel injection nozzle 78 by which the fuel is atomized into the air stream flowing toward the intake valve 68 during the intake stroke. A valve 77 controls supply of fuel to the nozzle 78.

In Fig. 2 a hot spot ignition cell 80 is shown as ported out into chamber 66 at a point adjacent the exhaust valve 70. With this location the cell 80 retains at all times a considerable amount of heat and can function as an ignition element for the air-fuel charge in the cylinder at the beginning of the first power stroke.

As shown in Fig. 3, provision is made for water-cooling the upper part of the working cylinder and the ignition and valve chamber. However, water cooling is not absolutely necessary for the cylinder walls if the engine is operated on the preferred cycle of the present invention. A power cylinder suitable for practicing the process of the invention may be operated with a compression ratio in the range 5–8, or in other words with substantially the same compression ratio as any gasoline engine. Since, according to the preferred cycle, the air for the first power stroke is precompressed to a maximum of about 40% of its original volume, the engine may operate with an overall compression ratio of between 12½ and 20.

In practicing the cycle in a single cylinder power unit, the air and fuel intake valve 68 is only open during the first of three engine revolutions making up the cycle. The exhaust valve 70 operates during the second revolution of the engine and again during the third revolution. While not specifically illustrated, it will be understood that the intake and exhaust valves may be suitably actuated and timed from the engine crank shaft.

The complete operating cycle will now be described, as practiced in a single cylinder power unit of the type illustrated in Figs. 1 to 4, inclusive.

Referring to Figs. 1 and 3, the intake valve 68 remains open during the first stroke of the piston, and the total air charge for a complete cycle is taken in from the cold air supply pipe 74. Normally the first 30%–40% of the air charge is taken into the cylinder as clean cold air during the first part of the intake stroke while the fuel supply to carbureter 76 is cut off by a valve 77. During the last part of the intake stroke the balance of the air for the complete cycle is taken in in the form of a preformed fuel-air mixture, the fuel being introduced into the air at the carbureter 76. By thus admitting the air for both power strokes in successive periods of the intake stroke, the gases within the cylinder with the piston 58 in the position shown in Fig. 1, will consist of a stratum of pure cold air above the piston and below the imaginary dividing line 84, while that part of the cylinder lying above the dividing line 84 is filled with an air-fuel mixture, the components of which are in substantially theoretically correct proportions for perfect combustion during the first power stroke.

While some stratification of successively introduced volumes of gases within the cylinder of a high speed engine might be expected from normal operating experience, the engine of the present invention is designed to promote and assure such stratification by providing an ignition and valve chamber 66 at the combustion end of the cylinder having sufficient volume to make up the major part of the desired clearance space, and by providing a throat 52 of substantial area, i. e., at least one-fourth the area of the cylinder, communicably connecting such combustion space with the cylinder proper. By this construction any air or air-fuel mixture which is admitted past the inlet valve 68 at high velocity is forced to spread out in all directions within the valve chamber 66 across the whole width of the cylinder bore. In doing so the rate of flow is slowed down in amount inversely proportional to the increase of cross-sectional area of flow within the chamber. By that time any kinetic or inertia energy which might have been able to upset or disturb stratification of the gas layers adjacent the piston top has been absorbed within the gases inside the valve chamber, and following the receding piston, these gases flow through the throat 52 to fill up the cylinder space according to the principle of continuity. The air is normally introduced to the cylinder in a precompressed state and preferably after intercooling down to a temperature of about 100° F. (560° F. Abs.).

After the successive introduction of pure air and air-fuel mixture has been effected during the intake stroke in such a way as to promote stratification of the bodies of air and air-fuel mixture, such stratification is readily maintained during the succeeding compression and power strokes. As shown in Fig. 2, the combustible mixture has been compressed at the end 64 of the compression stroke into the ignition and combustion chamber 66, with the body of pure air underlying the combustion mixture below the imaginary dividing line 86, in the clearance space 62. The temperature of both layers of compressed gas is raised during the compression stroke to an absolute temperature of about 1000° F. as a result of substantially adiabatic compression.

During the compression stroke a small portion of the combustible mixture is forced into ignition cell 80, which is so constructed that it remains in a substantially red hot condition throughout a complete operating cycle; or a glow bar or spark plug 88 (Fig. 2) may be disposed at the end of the cell 80 for the purpose of igniting the combustion mixture compressed into the cell at substantially the top dead center position 64 of the piston 58.

After ignition, the combustible mixture in chamber 66 starts to expand at the beginning of the power stroke, the front wave of the body of expanding gases assuming substantially the position outlined by the imaginary line 100 in Fig. 2. This expansion continues as shown in Fig. 1, driving the piston 58 toward its bottom dead center position, the stratification interface between the expanding products of combustion and the pure air assuming substantially the position of the imaginary dotted line 102. The curvature assumed by this interface 102 will vary with variations in the area ratios of the throat 52 and cylinder 60, and with variations in the volumetric ratios of the combustion spaces inside valve chamber 66 and cylinder clearance space 62. It will of course be appreciated that the imaginary lines designated 84, 86, 100 and 102 in Figs. 1 and 2 are intended to indicate the position of the interface between the air and gas strata within the cylinder, as such interface would be outlined when viewed in vertical cross section. There is no difficulty in maintaining such stratification in either horizontally or vertically disposed cylinders, over so short a period as is available for each individual cycle of high speed engines. Such curved gas interfaces are commonly illustrated by experiments on acoustical vibrations wherein the gas layers oscillate at very high frequencies. However the piston oscillations in engines operating at the highest rotational speeds develop gas vibrations very much below the frequencies of sound.

As shown in Fig. 1, the considerable expansion in volume of the ignited and burning gases which form the upper gas layer in the cylinder and chamber 66, effects additional compression of the air forming the lower gas layer, and since the original ignition and expansion largely takes place within a chamber 66 and connecting throat 52 having a cross-sectional area normally smaller than that of the cylinder proper, the resulting expansion of hot gases into that zone of the cylinder previously occupied by the air forces the air outwardly as well as downwardly into closer contact with the cylinder walls 60 and the piston 58 (Fig. 1). Thus the compressed pure air below the interface 102 Fig. 1 functions as an insulating and heat absorbing cushion preventing direct contact between the combustion products and cylinder walls and piston, and the otherwise wasted heat is absorbed into the air instead of being lost to the walls by radiation, convection, and conduction during this first power stroke.

According to the present invention the first power stroke is conducted with a distinct and very hot core of combustion products and with a relatively cool ambient air envelope, as against standard procedure wherein a substantially homogeneous mixture of burned gases and unburned air is in direct contact with the walls. Due to the poor heat conductivity of gases in general, very large differences in temperature can and will be maintained between the excess air and burning gases during individual power strokes. Thus the excess air envelope in the cylinder of an engine operating on the cycle of the present invention is not heated as much as the same proportion of excess air weight would be heated in a Diesel engine, for example, operating with a homogeneous cylinder mixture of the same air-fuel ratio. Furthermore, when the air component of the charge is precompressed and intercooled before its introduction to the cylinder, the compact body of excess air is present inside the cylinder in a cooler state, and because of the larger temperature gradient thereby existing between the air and burning gases, the air cushion can accept and return immediately as power in excess over the compression work, much of the heat radiated from the hot burning gas core, permitting very little heat transfer to the cylinder walls.

Such mechanism of heat exchange within the total gaseous cylinder charge may be utilized advantageously either to produce an indicator card of greater area, or preferably to produce the same size of indicator card area with a fuel charge smaller to the extent of heat prevented from entering the cooling walls. The core of combustible mixture in this case can be kept either of smaller proportion or of a somewhat leaner composition, assuring better combustion without dissociation, and the puff exhaust gas will not be too hot.

At the end of the third stroke the burned core of combustion products is exhausted from the cylinder by the first puff exhaust, and the original excess air is retained for the fourth, fifth and sixth strokes in a sufficiently preheated state from the first power stroke to fill up the cylinder space at about atmospheric pressure, or at about exhaust receiver pressure when an exhaust gas turbine is employed.

During the fourth stroke this rarified air is given the same moderate compression as was applied during the second stroke, with a corresponding moderate adiabatic rise of its temperature level. This time, however, the compressed air charge is finally heated to a compression and temperature high enough to assure self ignition of solidly injected fuel, since the compression started with the air already well preheated.

The fifth and sixth strokes of the cycle are entirely similar to the power and exhaust strokes of a standard four cycle engine.

Another important feature of this power cycle is the definite elimination of the detrimentally high peak explosion pressures encountered in modern high speed diesels. Although in the first power cycle the core of the charge is an almost theoretically correct mixture, the overall charge air fuel ratio is lean. The second power stroke operates at a peak pressure substantially the same as that of a moderate gasoline engine cycle; however, its air-fuel mixture must be kept slightly leaner to avoid smoky combustion.

At the end of the first power stroke valve 70 opens as the piston approaches bottom dead center.

In Fig. 2 the exhaust valve 70 has been shown in closed position, but when open, this valve permits discharge of the exhaust gases from the cylinder into a collector or gas turbine 50 (Fig. 3) against a back pressure, preferably of about 30 pounds absolute. Thus the lower stratum of air within the cylinder is permitted to expand down to this pressure lever and to occupy substantially the total cylinder space, thereby scavenging the cylinder of combustion products. The exhaust valve is then closed and the air remaining in the cylinder is recompressed to a final pressure which may be substantially two-thirds of the peak pressure developed in the cylinder during the first compression stroke. At the same time the temperature of this air rises to about twice the absolute temperature of the air at the beginning of this second compression stroke. In other words, the temperature of the air after this second compression is such as to allow for self-ignition of the combustion mixture formed by pressure injection of the second charge of fuel through the nozzle 72.

While the preferred operating cycle contemplates use of a carbureter 76 in the air supply line for the purpose of producing a well-balanced combustible mixture of air and gas which is burned during the first power cycle, it will be appreciated that the combustible mixture for the first power cycle could be produced by employing a fuel injector nozzle such as 72, through which the fuel could be projected into the body of air introduced (preferably compressed and intercooled) to the cylinder during the second stage of the air intake stroke. The use of the carbureter 76 is preferred to insure the most efficient mixing of the air and fuel which is to be used during the first power stroke.

The apparatus of Fig. 3 has been illustrated to include means whereby the body of air which is admitted to the cylinder for use during the second power stroke may be cooled, while the air which is mixed with fuel for combustion during the first power stroke is admitted to the cylinder without intermediate cooling. To effect this result, the section of the air pipe 74 within which is located the intercooler 56 and carbureter 76 is mounted in parallel or shunt with another section of pipe 82 within which there is mounted a carbureter 90. A pair of shuttle valves 106—108 is mounted in position to control circulation of air from the compressor either through pipe 82 and carbureter 90, or through the intercooler 56 and carbureter 76. As shown, these shuttle valves may be rotatably mounted on a shaft 110 actuated from the engine crank shaft 112 at a speed which is proper for regulating introduction of successive proportional volumes of cool fresh air and hot carbureted fuel-air mixture to the cylinder during the intake stroke. This modification of the preferred apparatus to include the by-pass connection 82 and carbureter 90 together with the shuttle valves 106 and 108 and the actuating mechanism therefor, is particularly adapted to a cycle modification according to which during the first intake stroke a major part of the cycle air is conducted through the intercooler 56 to the cylinder 60, and during the last part of the intake stroke the remaining minor portion of the air passes through the carbureter 90 in a heated state where it is charged with fuel to provide an over-rich mixture. On the compression stroke this over-rich mixture is further heated and may reach a self-ignition temperature at the top dead center position of the piston.

The relative proportions of fresh air and air-fuel mixture admitted to the cylinder during the first intake stroke may be widely varied. Normally it is preferred to admit about 30–40% of the air used in the complete cycle as cold fresh air during the first part of the intake stroke, and during the last part of the intake stroke to admit the balance of the air in an air-fuel mixture containing approximately 60–70% of all of the fuel which is used during the complete cycle.

The type of carbureter 76, 90 which is illustrated in Fig. 3 is designed particularly for use with a relatively low pressure fuel supply feeding a jet, the feed to which may be controlled by a needle valve 77 operated for example by suitable cam mechanism connected to the crank shaft. A high pressure fuel feed may of course be substituted supplying the fuel for example from a high pressure pump through an accumulator. The fuel supply valves 71 and 73 are actuated and timed from a camshaft to open only during the proper period for supplying fuel to the engine cylinder through the various fuel supply nozzles during the operating cycle. The fuel supply to pri- carbureter 76 will be cut off when carbureter 90 is used.

In a multi-cylinder engine the present six-stroke cycle process is carried out within two cylinders, the primary cylinder operating on a four-stroke cycle, and a secondary cylinder operating on a two-stroke cycle. In the particular engine illustrated diagrammatically in Fig. 5, three cylinders are provided, two of which operate on four-stroke cycles as primary cylinders, while a third cylinder operates on a two-stroke cycle as a secondary cylinder. A complete pressure volume diagram of the cycle as carried out in this multicylinder engine is the same as that for the one-cylinder engine.

The engine illustrated in Fig. 5 is equipped with two primary cylinders 120—122 operating on four-stroke cycles. Piston 124 in cylinder 120 is illustrated finishing its compression stroke, while piston 126 in cylinder 122 is shown completing its exhaust stroke. Piston 128 in the single secondary cylinder 130 operates on a two-stroke cycle, and is illustrated in the position assumed at the end of its own secondary compression stroke and the beginning of its power stroke. All three cylinders are illustrated as operating on the same crank angle. However, one primary cylinder always operates on a third stroke of its cycle while the other primary cylinder is operating on its first stroke, or in other words, the primary cylinders operate on cycles which have a 360° crank angle spacing.

The first three strokes of the operating cycle for each of the cylinders 120 and 122 follow substantially the same cycle as for the single cylinder six-stroke engine previously described. In the engine of Fig. 5, however, each of the cylinders 120 and 122 is provided with side wall air exhaust ports 132 which are uncovered by the pistons 124 and 126 as the pistons approach bottom dead center position. A pair of conduits or transfer passages 134 communicably connect the side wall discharge ports 132 of primary cylinders 120 and 122 with air inlet ports 136 opening into the combustion end of secondary cylinder 130. Flow of gas through the conduits 134 is regulated by a pair of apertured plunger valves 138 and 140 each operatively associated with one of the conduits 134. The opening and closing of valve 138 is preferably effected from a cam shaft 142 in timed relation to the position of piston 124 in cylinder 120; and likewise the opening and closing of valve 140 is effected in timed relation to the piston 126 in cylinder 122. In other words, valve 138 is opened for a crank angle period of say sixty to ninety degrees during each four-stroke cycle of piston 124 in cylinder 120, and the same is true with respect to valve 140 and the piston in cylinder 122. Valves 138 and 140 preferably open about 45° crank angle ahead of the bottom dead center position of their corresponding pistons 124 and 126 during the expansion or power stroke of the pistons. Likewise, the valves 138 and 140 are preferably timed to close about 45° crank angle beyond bottom dead center position of the corresponding piston on the exhaust stroke of the piston. The valves 138 and 140 are of course timed to remain closed during all other portions of the four stroke piston cycle practiced in each of the cylinders 120 and 122.

During the period in which each of the valves 138 and 140 remains open, the body of air which forms the lower layer of gases in the corresponding cylinders 120 and 122 during the power stroke is forced out from the corresponding primary cylinder through the corresponding conduit 134 into the combustion end of the secondary cylinder 130 through air intake ports 136. At the time that this transfer of air takes place from one of the primary cylinders to the secondary cylinder, the secondary piston is passing through its bottom dead center position, at the end of the expansion or working stroke, and at the beginning of the following compression stroke. Secondary cylinder 130 is illustrated as equipped with a plurality of side wall exhaust ports 144 located in a position approximately corresponding to the position of the air discharge ports 132 in the primary cylinders 120 and 122. In other words, exhaust ports 144 in cylinder 130 are uncovered by the piston 128 during the period in which the piston is passing through its bottom dead center position. Therefore introduction of air from one of the primary cylinders into the combustion end of the secondary cylinder 130 serves the double purpose of scavenging cylinder 130 of products of combustion produced therein during the preceding power stroke, and filling the cylinder with preheated air preparatory to the compression stroke of piston 128.

At the end of the secondary compression stroke in cylinder 130 fuel for the secondary power stroke is injected through a high pressure injection nozzle 146, and on the power stroke ignition and combustion of the air-fuel mixture takes place in the cylinder. During the exhaust strokes of the pistons in each of the primary cylinders 120 and 122, the products of combustion remaining in the corresponding cylinder after discharge of the lower layer of air into the secondary cylinder, are exhausted into the open atmosphere or into an exhaust receiver or exhaust turbine 148, preferably against a relatively low back pressure.

As will be appreciated, each of the primary cylinders 120 and 122 is so constructed as to follow closely in design and operation the single cylinder engine which is illustrated in Figs. 1 and 3. Each of the cylinders 120 and 122 is preferably equipped with an ignition and valve chamber 66 at its combustion end, which chamber corresponds in design and function with the corresponding chamber 66 of the single cylinder engine. Air inlet valves 68 and gas exhaust valves 70 are mounted in the valve chambers 66 of each primary cylinder. Air valves 68 and fuel valves 77 function to control the successive admission of pure air and of precarbureted air-fuel mixture to the valve chamber, and thence through a throat 52 into the working cylinder proper, during the intake stroke of the piston. Likewise exhaust valves 70 operate to permit outflow of waste combustion gases from the cylinder and valve chamber 66 during the exhaust stroke of the piston, following the closing off of the air discharge ports 132 and connecting conduit 134, within approximately the first 45° movement of the crank operating the piston beyond bottom dead center on its exhaust stroke.

A design feature of the combustion end of the secondary cylinder 130 consists in having the air supply conduits 134 and the tangentially arranged ports 136 directed upwardly or toward the cylinder head. Likewise the head of the cylinder 130 is preferably built with a conical taper, with the fuel injection nozzle 146 located at the apex of the cone. By this construction highly efficient scavenging is assured because the inflowing air builds up a compact and stable rotating gas cylinder, growing at a steady rapid rate and moving downwardly to force from the cylinder space gaseous products of combustion produced during the preceding power stroke.

While the secondary cylinder 130 operates on a two-stroke cycle, this operation is effected without the usual port difficulty experienced in two-cycle engines. In the first place it is only preheated air, and not very hot combustion products, which is to be transferred from cylinders 120 and 122 by way of the ports 132 and admitted through the admission ports 136. Furthermore the exhaust ports 144 are not subjected to severe heat stresses for the reason that the weights of hot gas handled in the secondary cylinder 130 are considerably lower than corresponding values for the usual two-cycle engine.

The engine which is illustrated in Fig. 5 is designed with the pistons of each of the three cylinders operating on the same crank angle. It will be recognized, however, that the piston of the secondary cylinder need not operate on the same crank angle as the pistons of the primary cylinders, since by reversing the position of this cylinder so that the combustion end of the cylinder is at the lower end of the piston stroke, the piston can be operated at a crank angle spaced 180° in phase from the crank angle common to the pistons of the high pressure cylinders.

Fig. 5 illustrates diagrammatically how the operation of each of the gas flow control valves as well as of the pistons and fuel valves can be effected and timed from the main engine crank shaft 150. Each of the valves 68, 70, 77, 138, and 140 is actuated from cam shaft 142 by means of connecting rods and cams or eccentrics rotatably connected to the cam shaft. The cam shaft 142 is in turn driven from crank shaft 150 at half the speed of the crank shaft, by means of a connecting shaft 152 and suitable connecting gearing. Each of the pistons 124, 126, and 128 is connected directly to the drive shaft by piston and connecting rods, cross heads and cranks. While Fig. 5 includes no illustration of specific means for supplying the air and fuel to the primary cylinders of the engine, it will be appreciated that according to the preferred cycle such means would include an air compressor, air intercooler and fuel carburetor 76, preferably arranged substantially in the same relative relation as the corresponding elements 54, 56, and 76 associated with the single cylinder engine of Fig. 3.

By carrying out the internal combustion operation in accordance with the preferred six-stroke cycle, burning the fuel supply for one cycle in two power strokes, it is possible to secure efficient combustion without developing excessive pressures within the cylinder on either power stroke, thereby assuring safe operation and normal wear for the engine. By the use of supercharging or precompression of the combustion air, preferably with some intercooling, the engine can be operated with an overall compression ratio lying in substantially the same range as the compression ratios for standard compression ignition engines of the Diesel type, while holding the pressures developed within the cylinders well within gasoline engine practice. By operating on a cycle which employs precarburetion of the fuel-air charge which is burned during the first power stroke, substantially 100% combustion efficiency can be assured for this stroke even though ignition of the mixture is effected by means of a spark or hot spot ignition element. Even the use of the spark or hot spot element during the first power stroke has its advantages. In the first place this insures easier starting of the engine as compared to self-ignition engines; and in the second place an opportunity is afforded for operating the engine with efficient combustion during idling, as by cutting out the second power stroke and operating the engine only on one power stroke for each six-stroke cycle. Thus by the preferred cycle of the present invention, that portion of the fuel combustion which takes place during the first power stroke develops under conditions closely resembling those existing in standard slow speed engines operating with nearly constant pressure combustion, whereas the combustion occurring during the second power stroke is readily controlled as to the pressures developed mainly by regulating the volume of excess air which is present as a heat-absorbing gas cushion during combustion in the first power stroke.

The invention having been thus described, what is claimed as new is:

1. In an internal combustion engine, a cylinder bore, a piston mounted for reciprocation in said bore, an ignition and valve chamber at one end of the bore, a throat permanently and communicably connecting the chamber and bore, said throat having a cross-sectional area not less than ¼ of the cross sectional area of the bore, an air and fuel supply inlet and a burned gas discharge passage ported out in said chamber, valves for said inlet and discharge passages, an igniting element positioned within said chamber, two air supply pipes communicably connected to said air inlet, a fuel carburetor disposed at an intermediate point in one of said pipes, valves arranged for delivering air and air-fuel mixture to said air inlet alternatively through said air supply pipes, and valve actuating and timing mechanism arranged for operating said valves in timed relation to the engine operating cycle to supply air and air-fuel mixture successively to the air inlet during a single air intake stroke of the piston.

2. In an internal combustion engine, a cylinder bore, a piston mounted for reciprocation in said bore, an ignition and valve chamber at one end of the bore, a throat permanently and communicably connecting the chamber and bore, said throat having a cross-sectional area not less than one quarter of the cross-sectional area of the bore, an air and fuel supply inlet and a burned gas discharge passage ported out in said chamber, valves for said inlet and discharge passages, an igniting element positioned within said chamber, an air compressor, a pipe communicably connecting said air compressor and the air inlet, a fuel carburetor disposed in an intermediate portion of said pipe, an intercooler mounted in a section of the pipe arranged as a by-pass around the carburetor, and a pair of valves and actuating mechanism therefor for alternatively connecting said carburetor and intercooler into the pipe leading from the compressor to the air inlet to the valve chamber.

3. In an internal combustion engine, a pair of primary and secondary cylinder bores, a pair of pistons, one of which is mounted for reciprocation respectively in each bore, an ignition and valve chamber disposed at one end of the primary bore, a throat communicably connecting said chamber and the primary bore, said throat having a cross-sectional area of not less than ¼ of the cross sectional area of the bore, an air and fuel inlet passage and a burned gas discharge passage ported out in said chamber, valves for said inlet and outlet passages movably mounted within said chamber, an air discharge port in the wall of said primary bore at the end thereof opposite the chamber and in position to be uncovered by the piston at the bottom dead center of its stroke, a valved air transfer passage and ports communicably connecting the air discharge port of the primary cylinder bore with the ignition end of the secondary cylinder bore, a fuel injection nozzle ported out in the ignition end of the secondary cylinder bore, and a gas discharge port opening into the side wall adjacent the bottom dead center position of the piston in the secondary cylinder bore.

4. Apparatus as defined in claim 3 in which the air transfer passage and ports opening into the ignition end of the secondary cylinder are arranged to inject the transferred air into the secondary cylinder in a direction toward the cylinder head.

5. In an internal combustion engine, a cylinder bore, a piston mounted for reciprocation in said bore, an ignition and valve chamber at one end of the bore, a throat permanently and communicably connecting the chamber and bore, an air supply inlet, a fuel inlet, and a burned gas discharge passage all ported out in said chamber, valves for such inlets and discharge passage, an igniting element positioned in said chamber, an air supply conduit communicably connected to said air inlet, a carbureter disposed at an intermediate point in said air supply conduit, valves arranged alternatively to supply pure air and air carbureted with fuel to said inlet through said air supply conduit, and valve actuating and timing mechanism arranged for operating said valves in timed relation to the engine operating cycle to supply air and air-fuel mixture successively during a single air intake stroke of the piston.

6. A six-stroke cycle internal combustion engine comprising a combustion cylinder, a piston mounted for reciprocation therein, an ignition and valve chamber at one end of the cylinder, an air intake port and a gas discharge port for said chamber, valves for said intake and discharge ports, an air compressor, a pair of air supply conduits with valves arranged for alternatively supplying air to said air intake port, the compressor, a fuel carbureter mounted in one of said air supply conduits, and valve actuating and timing mechanism arranged for operating said valves in timed relation to the engine operating cycle to supply air and air-fuel mixture successively during a single air intake stroke of the piston.

7. A six-stroke cycle internal combustion engine comprising a combustion cylinder, a piston mounted for reciprocation therein, an ignition and valve chamber at one end of the cylinder, an air intake port and a gas discharge port for said chamber, valves for said intake and discharge ports, an air supply pipe communicably connected to said air intake and having a fuel carbureter disposed at an intermediate point thereof, a fuel supply pipe leading to said carbureter, a valve in said fuel supply pipe, and actuating and timing mechanism for operating said valves in timed relation to the engine operating cycle to supply air and air-fuel mixture successively and alternatively during a single air intake stroke of the piston.

8. A six-stroke cycle internal combustion engine comprising a combustion cylinder, a piston mounted for reciprocation therein, an ignition and valve chamber at one end of the cylinder, an air intake port and a gas discharge port for said chamber, valves for said intake and discharge ports, a pair of air supply conduits with valves arranged for alternatively supplying air from a common source to said air intake port, a fuel carbureter mounted in one of said air supply conduits, a fuel injection nozzle ported out into said ignition and valve chamber, a valve for controlling supply of fuel to said nozzle, and actuating and timing mechanism arranged to open said valve only at the end of the fourth stroke of said engine cycle.

JOHANN J. WYDLER.